United States Patent
Fang et al.

(10) Patent No.: US 11,172,384 B2
(45) Date of Patent: *Nov. 9, 2021

(54) SELF-CALIBRATING RF NETWORK AND SYSTEM AND METHOD FOR USE OF THE SAME

(71) Applicant: Enseo, Inc., Plano, TX (US)

(72) Inventors: William C. Fang, Plano, TX (US); Raymond S. Horton, McKinney, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/916,570

(22) Filed: Jun. 30, 2020

(65) Prior Publication Data

US 2020/0336924 A1 Oct. 22, 2020

Related U.S. Application Data

(63) Continuation of application No. 15/723,608, filed on Oct. 3, 2017, now Pat. No. 10,701,569.

(60) Provisional application No. 62/403,244, filed on Oct. 3, 2016.

(51) Int. Cl.
| | | |
|---|---|---|
| *H04W 24/02* | (2009.01) | |
| *H04W 24/10* | (2009.01) | |
| *H04L 12/28* | (2006.01) | |
| *H04L 12/40* | (2006.01) | |
| *G06Q 50/12* | (2012.01) | |

(52) U.S. Cl.
CPC ......... *H04W 24/02* (2013.01); *H04L 12/2838* (2013.01); *H04L 12/2898* (2013.01); *H04W 24/10* (2013.01); *G06Q 50/12* (2013.01); *H04L 12/40* (2013.01); *H04L 2012/2841* (2013.01)

(58) Field of Classification Search
CPC .. H04W 24/02; H04W 24/10; H04L 12/2898; H04L 12/2838; H04L 2012/2841; H04L 12/40; G06Q 50/12
See application file for complete search history.

(56) References Cited

U.S. PATENT DOCUMENTS

| | | | |
|---|---|---|---|
| 3,781,703 | A | 12/1973 | Duty |
| 4,003,006 | A | 1/1977 | Mandeville et al. |
| 5,109,286 | A | 4/1992 | West, Jr. et al. |
| 5,390,348 | A | 2/1995 | Magin et al. |

(Continued)

*Primary Examiner* — Justin T Van Roie
(74) *Attorney, Agent, or Firm* — Scott Griggs; Griggs Bergen LLP (57) ABSTRACT

A self-calibrating RF network and system and method for use of the same are disclosed. In one embodiment, the self-calibrating RF network includes multiple hospitality properties, wherein RF network includes a property server located in communication with a terminal device providing data services through distribution elements to end point devices, such as set-top boxes. Each of the property servers collects RF performance data relative to the terminal device, the distribution elements, and the end point devices. The RF performance data is analyzed by a remote central server that provides RF adjustment data, which is indicative of power and equalization adjustments to the terminal device, power and equalization adjustments to the plurality of distribution elements, and power and ranging adjustments to the plurality of end point devices.

20 Claims, 4 Drawing Sheets

(56) References Cited

U.S. PATENT DOCUMENTS

| | | |
|---|---|---|
| 6,351,631 B1 | 2/2002 | Noeske et al. |
| 6,430,200 B1 | 8/2002 | Han et al. |
| 6,587,012 B1 | 7/2003 | Farmer et al. |
| 7,058,436 B2 | 6/2006 | Kai et al. |
| 7,693,491 B2 | 4/2010 | Pan |
| 7,792,183 B2 | 9/2010 | Massey et al. |
| 8,325,613 B2 | 12/2012 | Okamoto |
| 8,990,864 B2 | 3/2015 | Anandakumar et al. |
| 10,701,569 B2 * | 6/2020 | Fang .................... H04W 24/10 |
| 2002/0044610 A1 | 4/2002 | Jones |
| 2002/0160800 A1 | 10/2002 | Rozmaryn |
| 2002/0183033 A1 | 12/2002 | Gu et al. |
| 2005/0157804 A1 | 7/2005 | Jones |
| 2005/0183130 A1 | 8/2005 | Sadja et al. |
| 2006/0116082 A1 | 6/2006 | Pan |
| 2006/0146169 A1 | 7/2006 | Segman |
| 2006/0211368 A1 | 9/2006 | Wisnia |
| 2008/0061842 A1 | 3/2008 | Paraschou et al. |
| 2008/0084956 A1 | 4/2008 | Paraschou et al. |
| 2008/0256421 A1 | 10/2008 | Gerstel et al. |
| 2009/0185037 A1 | 7/2009 | Shi et al. |
| 2009/0265745 A1 | 10/2009 | Egan, Jr. et al. |
| 2010/0017842 A1 | 1/2010 | Wells |
| 2010/0095344 A1 | 4/2010 | Newby et al. |
| 2010/0100918 A1 | 4/2010 | Egan, Jr. et al. |
| 2010/0100921 A1 | 4/2010 | Olson et al. |
| 2010/0100922 A1 | 4/2010 | Olson et al. |
| 2010/0125877 A1 | 5/2010 | Wells et al. |
| 2010/0146564 A1 | 6/2010 | Halik et al. |
| 2010/0189042 A1 | 7/2010 | Pan |
| 2010/0244980 A1 | 9/2010 | Olson et al. |
| 2010/0251314 A1 | 9/2010 | Olson et al. |
| 2010/0251320 A1 | 9/2010 | Shafer et al. |
| 2010/0251321 A1 | 9/2010 | Palinkas et al. |
| 2010/0251322 A1 | 9/2010 | Palinkas et al. |
| 2010/0251323 A1 | 9/2010 | Jackson |
| 2010/0301972 A1 | 12/2010 | Alkan |
| 2010/0315942 A1 | 12/2010 | Jackson et al. |
| 2011/0072472 A1 | 3/2011 | Wells et al. |
| 2011/0085045 A1 | 4/2011 | Kelma |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2011/0181371 A1 | 7/2011 | Alkan et al. |
| 2011/0187481 A1 | 8/2011 | Alkan et al. |
| 2011/0199490 A1 | 8/2011 | Shafer et al. |
| 2011/0307548 A1 | 12/2011 | Fisk et al. |
| 2013/0318217 A1 | 11/2013 | Imes et al. |
| 2013/0332968 A1 | 12/2013 | Anandakumar et al. |
| 2015/0254726 A1 | 9/2015 | Cassidy et al. |

* cited by examiner

SELF-CALIBRATING RF NETWORK AND SYSTEM AND METHOD FOR USE OF THE SAME

PRIORITY STATEMENT & CROSS-REFERENCE TO RELATED APPLICATIONS

This application is a continuation of U.S. application Ser. No. 15/723,608 entitled "Self-Calibrating RF Network and System and Method for Use of Same," filed on Oct. 3, 2017, in the names of William C. fang et al., now U.S. Pat. No. 10,701,569, issued on Jun. 30, 2020; which claims priority from U.S. Patent Application No. 62/403,244 entitled "Self-Calibrating RF Network and System and Method for Use of the Same" and filed on Oct. 3, 2016, in the names of William C. Fang et al.; both of which are hereby incorporated by reference, in entirety, for all purposes. This application discloses subject matter related to the subject matter disclosed in the following commonly owned, application: U.S. patent application Ser. No. 15/723,769 entitled "Distribution Element for a Self-Calibrating RF Network and System and Method for Use of the Same" and filed on Oct. 3, 2017, in the names of William C. Fang et al., now U.S. Pat. No. 10,425,617, issued on Sep. 24, 2019; which is hereby incorporated by reference, in entirety, for all purposes.

TECHNICAL FIELD OF THE INVENTION

This invention relates, in general, to high-bandwidth data transfers over an existing cable TV (CATV) radio frequency (RF) network and, in particular, to self-calibrating RF networks and systems and methods for use of the same that address and enhance network performance.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a high bandwidth data transfer RF network that would improve upon existing limitations in performance. It would also be desirable to enable a computer-based electronics and software solution that would provide an experience in the hospitality lodging industry, or in another environment, with minimum video glitches and data interruptions. To better address one or more of these concerns, a self-calibrating RF network and system and method for use of the same are disclosed. In one embodiment, the self-calibrating RF network includes multiple hospitality RF network properties, wherein each RF network includes a property server located in communication with a terminal device providing data services through distribution elements to end point devices, such as set-top boxes. Each of the property servers collects RF performance data relative to the terminal device, the distribution elements, and the end point devices. The RF performance data is analyzed by a remote central server that provides RF adjustment data, which is indicative of power and equalization adjustments to the terminal device, power and equalization adjustments to the plurality of distribution elements, and power and ranging adjustments to the plurality of end point devices. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
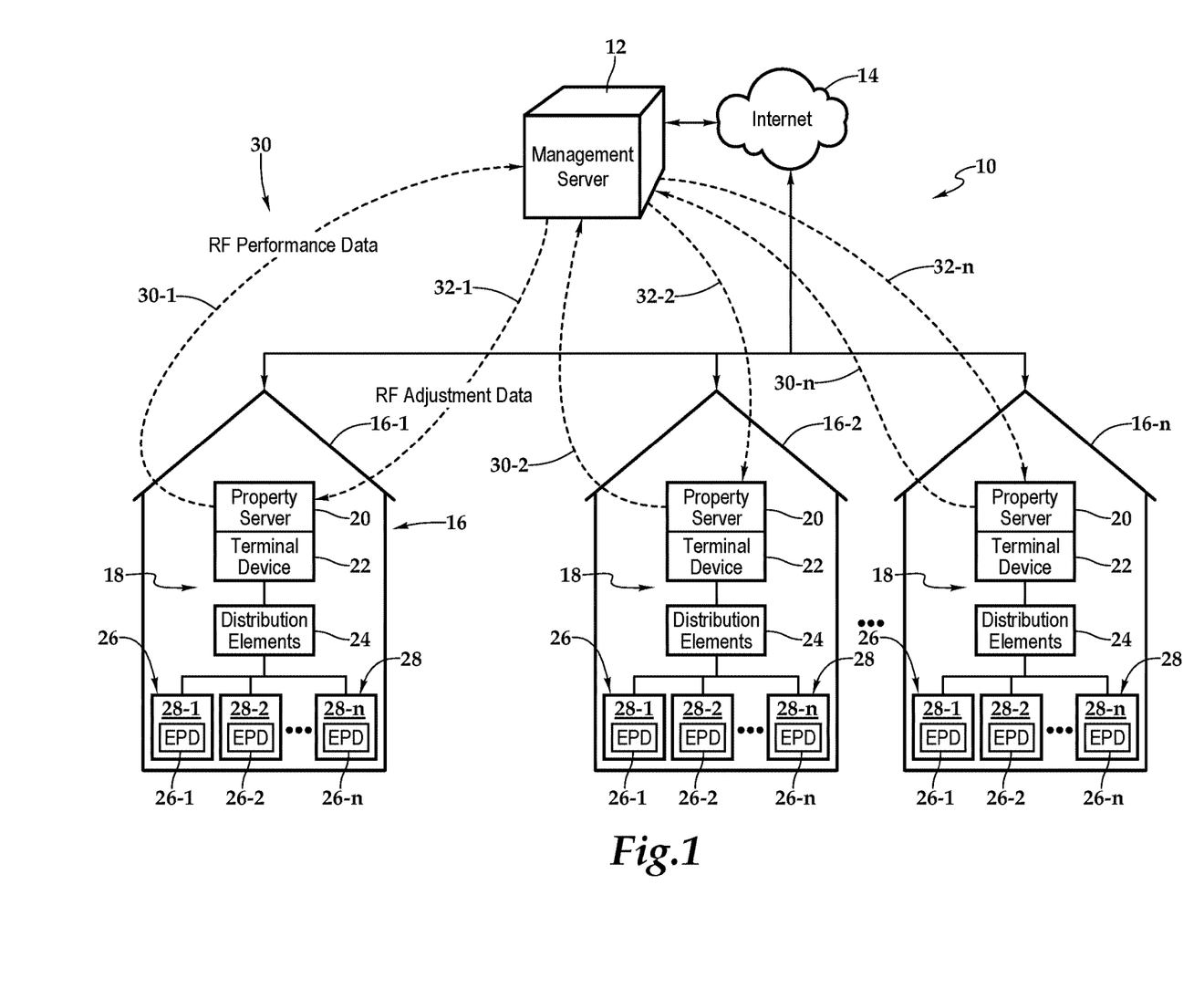
FIG. 1 is a schematic diagram depicting one embodiment of a self-calibrating RF network having high-bandwidth data transfers thereon according to the teachings presented herein.

Referring initially to FIG. 1, therein is depicted one embodiment of a system for providing self-calibrating RF networks, which is schematically illustrated and generally designated 10. A management server 12 utilizes the Internet 14 to communicate with multiple properties 16, which are individually labeled 16-1, 16-2, . . . 16-n. Each of the properties 16 may be a hospitality lodging establishment. The hospitality lodging establishment or, more generally, hospitality property, may be a multi-family residence, dormitory, lodging establishment, hotel, hospital, or other multi-unit environment, for example.

Each of the hospitality properties 16 includes an RF network 18 having a property server 20 located in communication with a terminal device 22. The property server 20 and the terminal device 22 may be at least partially integrated. The terminal device 22 provides data services through distribution elements 24 to end point devices 26, which subscribe to the data services. As illustrated, each end point device 26 is labeled 26-1, 26-2, . . . 26-n. In one implementation, each of the properties may include multiple rooms, generally labeled 28 and individually labeled 28-1, 28-2, . . . , 28-n. Further, each of the end point devices 26 may be located in a room 28.

More specifically, the terminal device 22 includes point-to-multipoint transmission in a downstream direction and multipoint-to-point transmission in the upstream direction. Further, the terminal device 22 may be a Cable Modem Termination System (CMTS) or a video distribution modulation device, for example. The distribution elements 24 may provide bi-directional RF signal distribution capability between the end point devices 26 and the terminal device 22. Additionally, the distribution elements 24 may provide self-generating upstream and downstream test signals for signal path diagnostic purposes. In one embodiment, the distribution elements 24 may include distribution amplifiers. The end point devices 26 furnish upstream maintenance on power adjustments through ranging requests and the end point devices 26 may include cable modem receivers or set-top boxes, for example.

As illustrated, each property server 20 sends RF performance data 30 to the management server 12. The individual instances of RF performance data 30 are labeled 30-1, 30-2, . . . , 30-n. The management server 12 processes the RF performance data 30 and sends RF adjustment data 32, in response, to the property servers 20. As shown, the individual instances of RF adjustment data 32 are labeled 32-1, 32-2, . . . , 32-n. A less than optimal tuned RF network typically experiences video glitches and data interruptions on the Internet connections of the subscribers at the end point devices 26. The system 10 provides self-monitoring and self-calibrating to the RF network 18 to optimally tune the RF network 18 and mitigate unwanted video glitches and data interruptions. The management server 12 receives the RF performance data 30, which includes physical device location information, the connection and distribution information, and substantially real time signal power level and quality reports and analyzes the data and determines the necessary adjustments to the various components terminal device 22, distribution elements 24, and end point devices 26—within the property 16. The various performance criteria and the signal adjustment algorithms are determined by and stored at the management server 12.

In one embodiment of this architecture, the distribution elements 24 include network controlled amplifiers that provide bidirectional RF signal distribution between the end point devices 26 and the terminal device 22, which, as mentioned, may include headend modulation equipment such as video servers and CMTS. Such distribution elements 24 may include built-in cable modem functionality that permits communication with the terminal device 22 and the end point devices 26, to enable the feeding of the signal measurement data to the management server 12 to complete the monitoring and provide for the calibration. In this scheme, the distribution elements 24 adjust the amplification levels and participate in diagnostic exercise by enabling test signal and test patters to bother upstream and downstream RF paths within the RF network 18.

Figure 2:
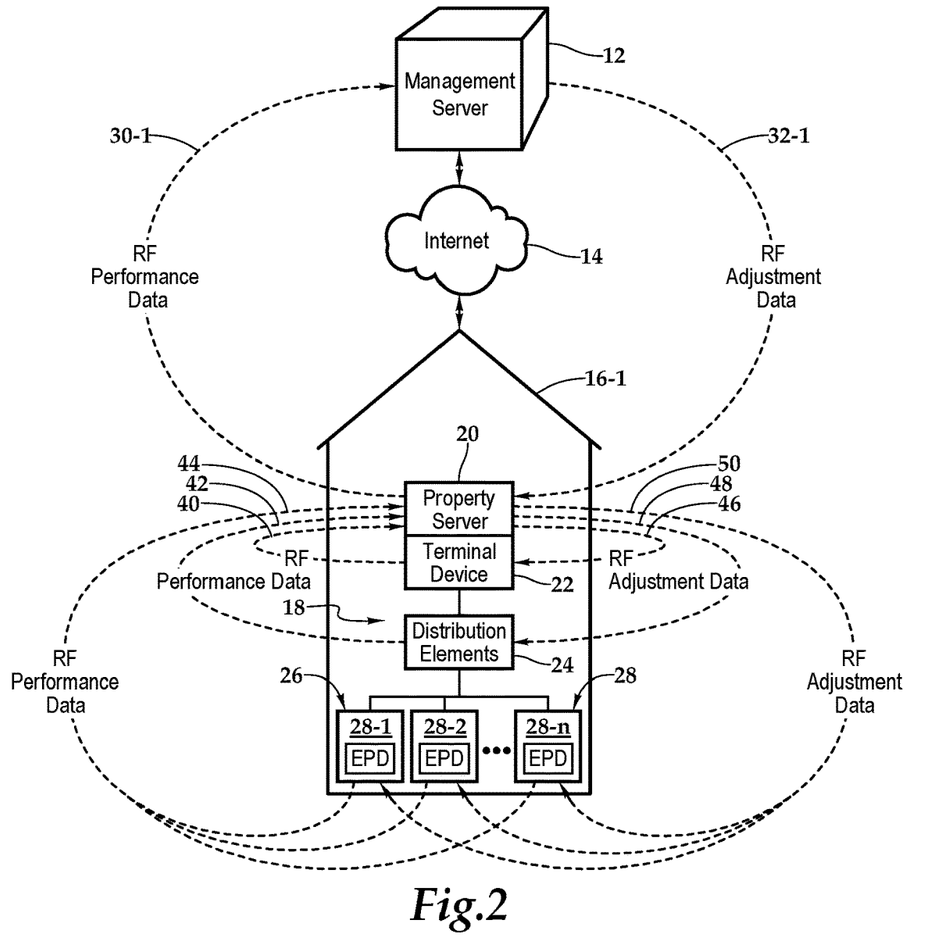
FIG. 2 is a schematic diagram depicting in additional detail a portion of the self-calibrating RF network shown in FIG. 1.

Referring now to FIG. 2, the property server 16-1 receives RF performance data relative to the terminal device 22, the distribution elements 24, and the end point devices 26 as shown by arrows 40, 42, 44. The RF performance data 42 from the distribution elements 24 to the property server 20 may be sent directly to the property server 20 or indirectly to the property server 20 through the terminal device 22. Similarly, the RF performance data 44 from the end point devices 26 to the property server 20 may be sent directly to the property server 20 or indirectly through either the distribution elements 24 or the terminal device 22 or both the distribution elements 24 and the terminal device 22.

The property server 16-1 receives the RF adjustment data 32-1 relative to the terminal device 22, the distribution elements 24, and the end point devices 26. The property server 16-1 then distributes the RF adjustment data 32-1 as shown by arrows 46, 48, 50. The RF adjustment data 48 to the distribution elements 24 from the property server 20 may be sent directly to the distribution elements or indirectly to the distribution elements through the terminal device 22. Similarly, the RF performance data 50 to the end point devices 26 from the property server 20 may be sent directly to the end point devices 26 or indirectly through either the distribution elements 24 or the terminal device 22 or both the distribution elements 24 and the terminal device 22. It should be appreciated that depending on the RF adjustment data 32-1 received from the management server 12, none or a subset of the RF adjustment data 46, 48, 50 may be sent by the property server 20 to the terminal device 22, distribution elements 24, and end point devices 26.

The RF performance data 30-1, which includes the RF performance data 40, 42, 44, may include analogue parameters and digital parameters. The property server 16-1, through communications with the terminal device 22, distribution elements 24, and end point devices 26, may measure analog parameters including analog signal levels, carrier level, carrier to noise ratio (CNR), signal to noise ratio (SNR), power line hum modulation. The property server 16-1, through communications with the terminal device 22, distribution elements 24, and end point devices 26, may measure digital parameters including modulation error ratio (MER), bit error rate (BER), digital signal level, frequency of lost packets, and jitter. Other parameters measured may include transmit time and associated timing adjustments that address the amount that the terminal device 22 and end point devices 26 must change transmit time in order for bursts to arrive at the appropriate time. Power level relating to the time length value (TLV) of cable modem signals may be monitored too as well as ranging status addressing the maintenance of cable modem signals.

Analogous to the RF performance data 30-1, the RF adjustment data 32-1, which includes the RF adjustment data 46, 48, 50, may include adjustments to analogue parameters and digital parameters. The property server 16-1, through communications with the terminal device 22, distribution elements 24, and end point devices 26, upon receiving the RF adjustment data 32-1 from the management server 12, may adjust analog parameters including analog signal levels, carrier level, carrier to noise ratio (CNR), signal to noise ratio (SNR), power line hum modulation. The property server 16-1, through communications with the terminal device 22, distribution elements 24, and end point devices 26, may also adjust digital parameters including modulation error ratio (MER), bit error rate (BER), digital signal level, frequency of lost packets, and jitter. Other parameters adjusted may include transmit time and associated timing adjustments that address the amount that the terminal device 22 and end point devices 26 must change transmit time in order for bursts to arrive at the appropriate time. Power level relating to the time length value (TLV) of cable modem signals may be adjusted too, as well as ranging status addressing the maintenance of cable modem signals.

The system 10 presented herein, in one embodiment, includes a management server 12 that can receive RF performance data relative to all devices on the RF network 18, including the property server 20, terminal device 22, distribution elements 24, and the end point devices 26. The management server 12 may then analyze the RF performance data 30 received and then provide the necessary power adjustments and equalization to the appropriate devices. Within one embodiment of this system 10, the end point devices 26 are able to provide signal measurement and diagnostic information back to the management server 12 by utilizing proactive network management technology. Additionally, the end point devices exercise the standard upstream maintenance on power adjustments through various ranging requests and responses with the terminal device 22.

Figure 3:
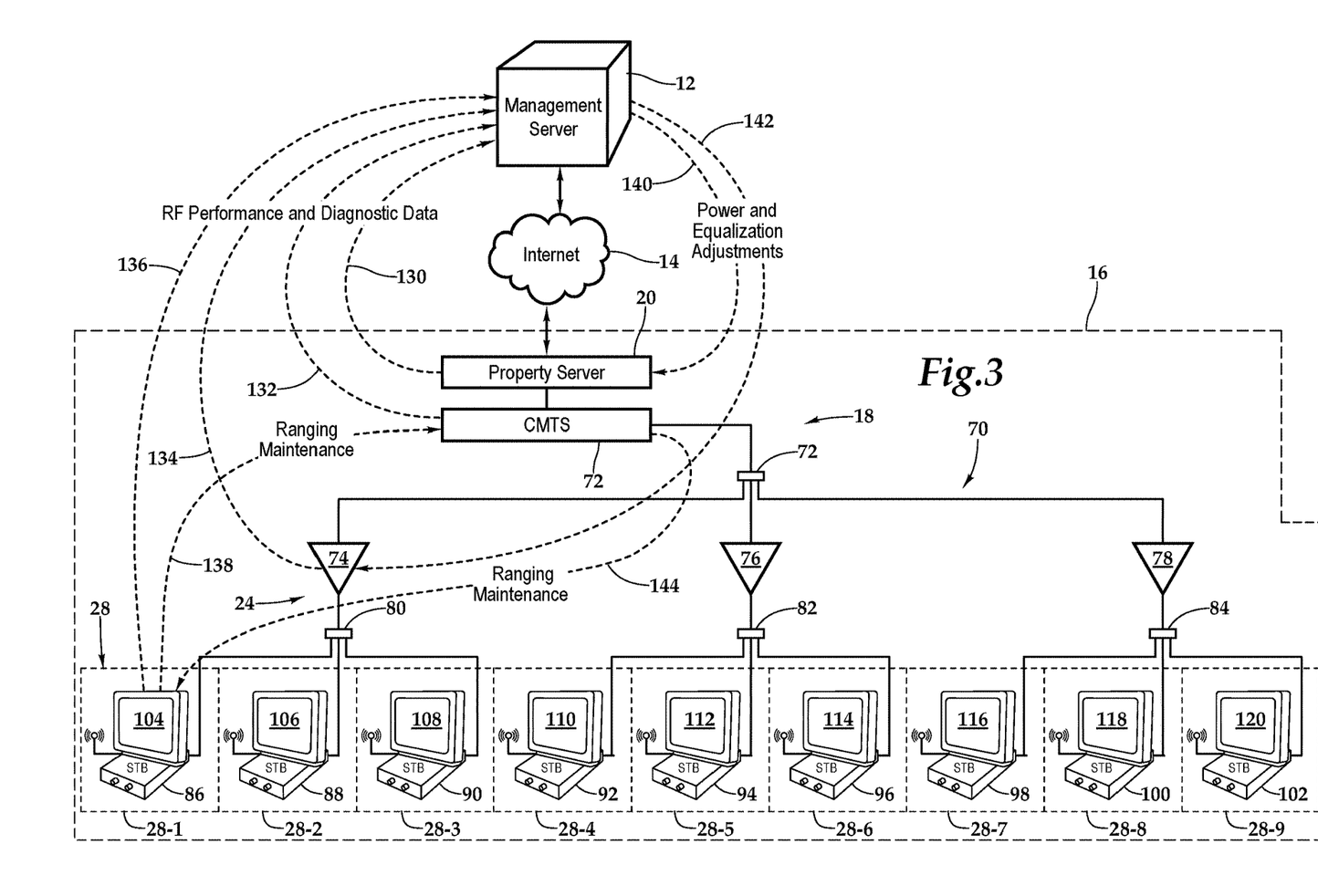
FIG. 3 is a schematic diagram depicting one embodiment of a self-calibrating CATV RF network having high-bandwidth data transfers thereon according to the teachings presented herein.

Referring now to FIG. 3, wherein one embodiment of a self-calibrating CATV RF network 70 having high-bandwidth data transfers thereon according to the teachings presented herein is illustrated. Similar to the RF network 18, the CATV RF network 70 includes the management server 12, which is a cloud-based server, in communication with properties 16 via the Internet 14. The property server 20 is co-located with CMTS 72, which server as the terminal device 22. As discussed, the management server 12, which will be discussed in more detail hereinbelow, may be a centralized management server that can take physical device location information, connection and distribution information and real time signal power level and quality reports from each end point device. The management server 12 may then analyze the data and determine the necessary adjustments to the distribution amplifiers and the headend modulation devices. The performance criteria and the signal adjustment algorithms are determined by the management server 12 or alternatively, stored at the management server 12.

In one embodiment, the CATV RF network 70 includes high-bandwidth data transfers and a shared bi-directional network with point-to-multipoint transmission in the downstream direction, and multipoint-to-point transmission in the upstream direction. Signals are distributed via an electrical signal on coaxial cable, for example via a tree and branch coaxial cable distribution network. Terminal equipment supports the delivery of cable services (video, data and voice services) to subscribers, via cable modems, for example. Data and voice services are supported by cable modems and communication gateways, respectively, which require the use of an upstream signal path. The network may use a fiber optic upstream signal path from the node to the headend. A return band is used to support transmissions from devices at subscriber's rooms to the headend.

Such a CATV RF network 70 generally uses standardized communication protocol based on the Data over Cable System Interface Specification (DOCSIS) to access data services through the cable network, by using the downstream path to indicate exactly when each modem is permitted to transmit in the upstream direction. The DOCSIS utilizes two primary data transmission elements; namely, the CMTS 72 located in specified nodes on the CATV RF network 70 for distributing data to end-of-line subscribers; and set-top boxes residing at subscriber's rooms. Subscribers send data from their digital devices (PC, VoIP phone, Video IP device, etc) into the set-top box, which then relays the data to the CMTS, which in turn relays the information to the appropriate network element. Information destined to the subscriber digital device is provided from the network to the CMTS, which in turn relays the information to the set-top box. The set-top box in turn relays the information to the subscriber's digital device, such as a television. Additional network elements may be placed inside the cable network to support service delivery or to monitor service quality. All system maintenance, operation and network communications are outlined in the DOCSIS specification.

The DOCSIS requires that the downstream communication path be properly functioning for any upstream communication to happen. In cases where the signal to noise ratio (SNR) is too low in the downstream path for the cable modem to receive data, the downstream path may be unusable while the upstream path may function correctly. In such cases, a service call may require a service technician to be dispatched to a subscriber's location, considerable cost and loss of time. It is, therefore, advantageous to implement an overall network management system that can quickly and cost-effectively locate various network faults and monitor network performance to allow for optimum delivery of various services to subscribers.

Continuing to refer to FIG. 3, the CMTS 72 is a piece of equipment, typically located at a headend of the hospitality lodging establishment. The CMTS 72 is used to provide high speed data services, such as cable Internet or Voice over Internet Protocol, to cable subscribers. Various headend and video modulation devices may be incorporated into the CMTS 72 to receive RF signals transmitted efficiently through long distances and decode the RF signals at the video modulation devices.

A splitter 72 divides the signal and distribution amplifiers 74, 76, 78 take an RF signal as an input, amplify, and output the amplified RF signal, which, as shown travels through splitters 80, 82, 84 prior to reaching rooms 28-1, 28-2, 28-3, 28-4, 28-5, 28-6, 28-7, 28-8, and 28-9. In the various rooms 28 of the property, set-top boxes 86, 88, 90 92, 92, 96, 98, 100, 102 and displays 104, 106, 108, 110, 112, 114, 116, 118, 120 are located. As used herein, set-top boxes, back boxes and set-top/back boxes may be discussed as set-top boxes. By way of example, the set-top box may be a set-top unit that is an information appliance device that generally contains set-top box functionality including having a television-tuner input and displays output through a connection to the display or the television set and an external source of signal, turning by way of tuning the source signal into content in a form that can then be displayed on the television screen or other display device. Such set-top boxes are used in cable television, satellite television, and over-the-air television systems, for example.

The displays 102 through 120 may be an output device for display of information and the television set may be a device that combines elements of a tuner, display, and loudspeakers for the purpose of viewing information. As shown, groups of set-top boxes are secured to splitters 80, 82, 84, which may act as directional couplers, which are passive devices used in the field of RF that couple a defined amount of the electromagnetic power in a transmission line to a port enabling the RF signal to be used by multiple set-top boxes.

As depicted in FIG. 3, RF performance and diagnostic data 130, 132, 134, 136 is collected from the property server 20, CMTS 72, distribution amplifier 74, and the set-top box 86, by way of the ranging maintenance data 138. The management server 12 analyzes this data and sends power and equalization adjustments 140, 142 to the property 16. Additionally, ranging maintenance 144 is provided to the set-top box 86.

Figure 4:
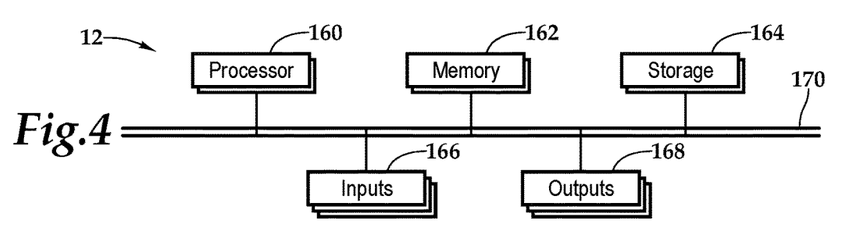
FIG. 4 is a functional block diagram depicting one embodiment of a management server presented in FIGS. 1, 2, and 3.

Referring to FIG. 4, the management server 12 includes a processor 160, memory 162, storage 164, inputs 166, and outputs 168 are interconnected by a bus architecture 170 within a mounting architecture. More generally, with respect to the management server 12, a common or distributed, for example, mounting architecture may be employed. In other implementations, in the management server 12, multiple processors and/or multiple buses may be used, as appropriate, along with multiple memories and types of memory. Further still, in other implementations, multiple computing devices may be provided and operations distributed therebetween.

The processor 160 may process instructions for execution within the computing device, including instructions stored in the memory 162 or in the storage 164. The memory 162 stores information within the computing device. In one implementation, the memory 162 is a volatile memory unit or units. In another implementation, the memory 162 is a non-volatile memory unit or units. Storage 164 provides capacity that is capable of providing mass storage for the management server 12. Various inputs 166 and outputs 168 provide connections to and from the management server 12, wherein the inputs 166 are the signals or data received by the management server 12, and the outputs 168 are the signals or data sent from the management server 12. In one implementation, the inputs 166 and the outputs 168 provide the connectivity to the Internet 14 and, therefore, the communication with the properties 16.

The memory 162 and storage 164 are accessible to the processor 160 and include processor-executable instructions that, when executed, cause the processor 160 to execute a series of operations. The processor-executable instructions receive at the inputs 166 the RF performance data from the properties 16 and thereafter, analyze the RF performance data. The processor executable instructions then, based on the analysis, determine at least one of: power and equalization adjustments to the terminal device, power and equalization adjustments to the multiple distribution elements, and various ranging maintenance to the end point devices. The processor-executable instructions then cause the processor to send at the outputs RF adjustment data, which, as discussed, the RF adjustment data may include adjustments to parameters selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status.

Figure 5:
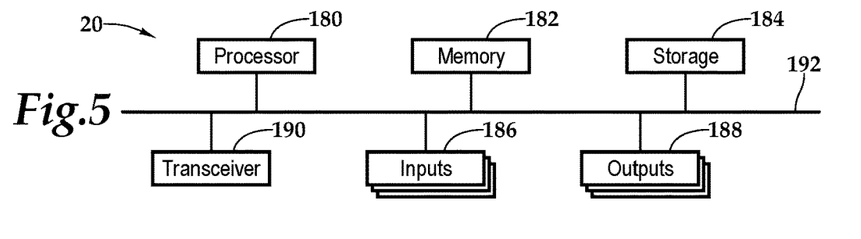
FIG. 5 is a functional block diagram depicting one embodiment of a management server presented in FIGS. 1, 2, and 3.

Referring now to FIG. 5, in one embodiment, the property server 20 includes a processor 180, memory 182, storage 184, inputs 186, outputs 188, and a transceiver 190 are interconnected by a bus architecture 192 within a mounting architecture. More generally, with respect to the property server 20, a common or distributed, for example, mounting architecture may be employed. In other implementations, in the property server 20, multiple processors and/or multiple buses may be used, as appropriate, along with multiple memories and types of memory. Further still, in other implementations, multiple computing devices may be provided and operations distributed therebetween.

The processor 180 may process instructions for execution within the property server 20, including instructions stored in the memory 182 or in the storage 184. The memory 182 stores information within the computing device. In one implementation, the memory 182 is a volatile memory unit or units. In another implementation, the memory 182 is a non-volatile memory unit or units. The storage 184 provides capacity that is capable of providing mass storage for the property server 20. The various inputs 186 and outputs 188 provide connections to and from the computing device, wherein the inputs 186 are the signals or data received by the server, and the outputs 188 are the signals or data sent from the property server 20. The transceiver 190 provides wireless capability to the property server 20. The inputs 186, the outputs 188, and/or the transceiver 190 may be utilized to communicate with the terminal device, distribution elements, and the end point devices as well as the management server via the Internet.

The memory 182 and the storage 184 are accessible to the processor 180 and include processor-executable instructions that, when executed, cause the processor 180 to execute a series of operations. The processor-executable instructions receive at the inputs the RF performance data relative to the terminal device, the distribution elements, and the end point devices. Then, the processor-executable instructions cause the processor to send at the outputs the RF performance data. Following the analysis by the manager server, the processor is caused to receive at the inputs RF adjustment data relative to the terminal device, the plurality of distribution elements, and the plurality of end point devices and process the RF adjustment data. The processor-executable instructions then cause the processor 180, based on the processing, to send at the outputs 188 at least one of: power and equalization adjustments to the terminal device, power and equalization adjustments to the distribution elements, and power and ranging adjustments to the end point devices.

Figure 6:
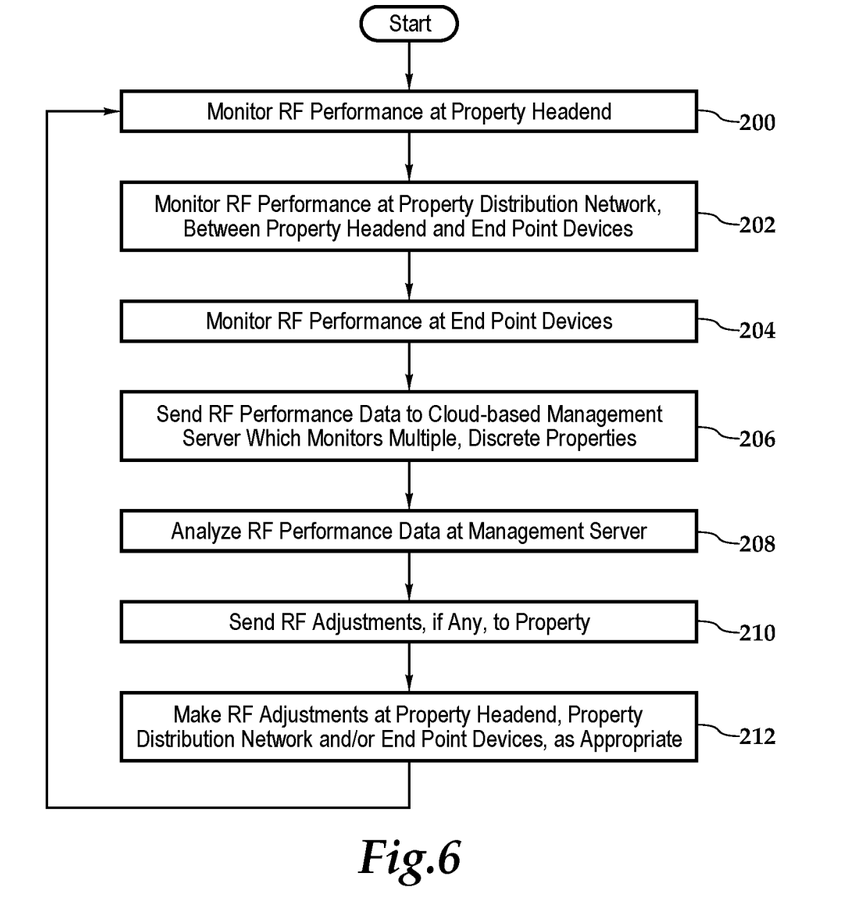
FIG. 6 is a flow chart depicting one embodiment of a method for using a self-calibrating RF network according to the teachings presented herein.

Referring now to FIG. 6, therein is depicted one embodiment of a method for using a self-calibrating RF network according to the teachings presented herein. At block 200, the property server monitors the RF performance at the property headend, which, as previously mentioned, may include the property server and the terminal device. At block 202, RF performance is monitored at the property distribution network, between the property headend and the end point devices. At block 204, RF performance is monitored at the end point devices, which, as discussed, may be set-top boxes. At block 206, the RF performance data is sent to the cloud-based management server, which monitors multiple, discrete properties.

At block 208, the RF performance data is analyzed at the management server. At block 210, if any adjustments are needed in the property headend, property distribution network and/or end point devices, RF adjustments are sent from the management server to the property. At block 212, the necessary RF adjustments are made at the property headend, property distribution network and/or end point devices. The process then returns to block 200.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A server for a self-calibrating RF network, the server comprising:

a processor, memory, storage, inputs, outputs, and a terminal device;

a busing architecture communicatively interconnecting the processor, the memory, the storage, the inputs, the outputs, and the terminal device;

the terminal device providing data services through a plurality of distribution elements to a plurality of end point devices, the plurality of end point devices subscribing to the data services;

the inputs receiving RF performance data relative to the terminal device, the plurality of distribution elements, and the plurality of end point devices;

the RF performance data including physical device location information, the RF performance data further comprises parameters selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status; and the memory accessible to the processor, the memory including processor-executable instructions that, when executed, cause the processor to:

receive at the inputs the RF performance data relative to the terminal device, the plurality of distribution elements, and the plurality of end point devices, send at the outputs the RF performance data to a cloud-based central server located remote relative to the server, receive, from the cloud-based central server, at the inputs RF adjustment data relative to the terminal device, the plurality of distribution elements, and the plurality of end point devices, process the RF adjustment data, and based on the processing, send at the outputs at least one of:

power and equalization adjustments to the terminal device, power and equalization adjustments to the plurality of distribution elements, and power and ranging adjustments to the plurality of end point devices.

2. The server as recited in claim 1, wherein the RF performance data relates to a hospitality property selected from the group consisting of furnished multi-family residences, dormitories, lodging establishments, hotels, and hospitals.

3. The server as recited in claim 1, wherein the terminal device further comprises point-to-multipoint transmission in a downstream direction and multipoint-to-point transmission in an upstream direction.

4. The server as recited in claim 1, wherein the terminal device further comprises a device selected from the group consisting of cable modem termination systems and video distribution modulation devices.

5. The server as recited in claim 1, wherein the plurality of distribution elements provides bi-directional RF signal distribution capability between the plurality of end point devices and the terminal device and provide self-generating upstream and downstream test signals for signal path diagnostic purposes.

6. The server as recited in claim 1, wherein the plurality of distribution elements further comprises distribution amplifiers.

7. The server as recited in claim 1, wherein the plurality of end point devices provides upstream maintenance on power adjustments through ranging requests.

8. The server as recited in claim 1, wherein the plurality of end point devices further comprise a device selected from the group consisting of cable modem receivers and set-top boxes.

9. The server as recited in claim 1, wherein the RF performance data further comprises analog and digital parameters.

10. The server as recited in claim 1, wherein the RF performance data further comprises analogue parameters.

11. The server as recited in claim 1, wherein the RF performance data further comprises digital parameters.

12. The server as recited in claim 1, wherein the RF adjustment data further comprises adjustments to analogue parameters.

13. The server as recited in claim 1, wherein the RF adjustment data further comprises adjustments to digital parameters.

14. The server as recited in claim 1, wherein the RF adjustment data further comprises adjustments to parameters selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status.

15. The server as recited in claim 1, wherein the server comprises cloud-based functionality.

16. A server for a self-calibrating RF network, the server comprising:

a processor, memory, storage, inputs, outputs, and a terminal device;

a busing architecture communicatively interconnecting the processor, the memory, the storage, the inputs, the outputs, and the terminal device;

the terminal device providing data services through a plurality of distribution elements to a plurality of end point devices, the plurality of end point devices subscribing to the data services;

the terminal device including point-to-multipoint transmission in a downstream direction and multipoint-to-point transmission in an upstream direction, the terminal device being a device selected from the group consisting of cable modem termination systems and video distribution modulation devices;

the inputs receiving RF performance data relative to the terminal device, the plurality of distribution elements, and the plurality of end point devices;

the RF performance data including physical device location information, the RF performance data further comprises parameters selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status; and the memory accessible to the processor, the memory including processor-executable instructions that, when executed, cause the processor to:

receive at the inputs the RF performance data relative to the terminal device, the plurality of distribution elements, and the plurality of end point devices, send at the outputs the RF performance data to a cloud-based central server located remote relative to the server, receive, from the cloud-based central server, at the inputs RF adjustment data relative to the terminal device, the plurality of distribution elements, and the plurality of end point devices, process the RF adjustment data, and based on the processing, send at the outputs at least one of:
- power and equalization adjustments to the terminal device,
- power and equalization adjustments to the plurality of distribution elements, and
- power and ranging adjustments to the plurality of end point devices.

17. The server as recited in claim 16, wherein the RF performance data relates to a hospitality property selected from the group consisting of furnished multi-family residences, dormitories, lodging establishments, hotels, and hospitals.

18. The server as recited in claim 16, wherein the plurality of distribution elements provides bi-directional RF signal distribution capability between the plurality of end point devices and the terminal device and provide self-generating upstream and downstream test signals for signal path diagnostic purposes.

19. A server for a self-calibrating RF network, the server comprising:

a processor, memory, storage, inputs, and outputs;

a busing architecture communicatively interconnecting the processor, the memory, the storage, the inputs, and the outputs;

the inputs receiving RF performance data relative to a terminal device, a plurality of distribution elements, and a plurality of end point devices, the inputs being located in communication with the terminal device, the terminal device providing data services through the plurality of distribution elements to the plurality of end point devices, the plurality of end point devices subscribing to the data services;

the RF performance data including physical device location information, the RF performance data further comprises parameters selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status; and the memory accessible to the processor, the memory including processor-executable instructions that, when executed, cause the processor to:

receive at the inputs the RF performance data relative to the terminal device, the plurality of distribution elements, and the plurality of end point devices, send at the outputs the RF performance data to a cloud-based central server located remote relative to the server, receive, from the cloud-based central server, at the inputs RF adjustment data relative to the terminal device, the plurality of distribution elements, and the plurality of end point devices, process the RF adjustment data, and based on the processing, send at the outputs at least one of:
- power and equalization adjustments to the terminal device,
- power and equalization adjustments to the plurality of distribution elements, and
- power and ranging adjustments to the plurality of end point devices.

20. The server as recited in claim 19, wherein the RF performance data relates to a hospitality property selected from the group consisting of furnished multi-family residences, dormitories, lodging establishments, hotels, and hospitals.

* * * * *